United States Patent [19]
Karl et al.

[11] Patent Number: 5,692,390
[45] Date of Patent: Dec. 2, 1997

[54] DEVICE FOR CONTROLLING THE TEMPERATURE IN THE PASSENGER COMPARTMENT OF A VEHICLE WITH AN ELECTRIC MOTOR

[75] Inventors: Stefan Karl, Paris; Vincent Pomme, Montigny Le Bretonneux, both of France

[73] Assignee: Valeo Climatisation, Laverriere, France

[21] Appl. No.: 601,043

[22] PCT Filed: Jun. 28, 1995

[86] PCT No.: PCT/FR95/00863

§ 371 Date: Apr. 25, 1996

§ 102(e) Date: Apr. 25, 1996

[87] PCT Pub. No.: WO96/00664

PCT Pub. Date: Jan. 11, 1996

[30] Foreign Application Priority Data

Jun. 29, 1994 [FR] France .................................. 94 08028

[51] Int. Cl.[6] .................. F25B 27/00; G05D 23/00
[52] U.S. Cl. ................. 62/217; 62/238.7; 237/2 B
[58] Field of Search ................... 62/160, 238.6, 62/238.7, 199, 217; 237/2 B

[56] References Cited

U.S. PATENT DOCUMENTS

| | | | |
|---|---|---|---|
| 4,066,118 | 1/1978 | Goettl | 62/160 X |
| 4,553,401 | 11/1985 | Fisher | 62/238.7 X |
| 5,284,025 | 2/1994 | Kajitanii et al. | 62/238.7 X |
| 5,299,431 | 4/1994 | Iritani et al. | 62/243 |
| 5,309,731 | 5/1994 | Nonoyama et al. | 62/244 |
| 5,316,074 | 5/1994 | Isaji et al. | 165/43 |
| 5,325,912 | 7/1994 | Hotta et al. | 237/2 B |

FOREIGN PATENT DOCUMENTS 41 40 321 A1  9/1993  Germany .

*Primary Examiner*—William E. Wayner
*Attorney, Agent, or Firm*—Morgan & Finnegan, L.L.P.

[57] ABSTRACT

A temperature control device for an electric motor vehicle passenger compartment, wherein a fluid coolant flows through an inner heat exchanger arranged in the path of an air flow to the passenger compartment, a first outer heat exchanger arranged in the path of an air flow out of the passenger compartment, and a second outer heat exchanger [(42)] for exchanging heat with a heat source outside the passenger compartment. Said device may operate in heating mode or in cooling mode depending on the direction of flow of the fluid coolant. The device is useful in motor vehicles.

19 Claims, 4 Drawing Sheets

DEVICE FOR CONTROLLING THE TEMPERATURE IN THE PASSENGER COMPARTMENT OF A VEHICLE WITH AN ELECTRIC MOTOR

The invention relates to a device for controlling the temperature in the passenger compartment of a vehicle with an electric motor.

It relates more specifically to a device of the type comprising a circuit through which flows a fluid coolant, which is circulated by a compressor, between an internal heat exchanger located in the path of a flow of air towards the vehicle and an external heat exchanger, as well as means for reversing the direction of flow of the fluid coolant, such that the internal heat exchanger and the external heat exchanger function respectively as evaporator and condenser in a cooling mode and respectively as condenser and evaporator in a heating mode.

Thus, in cooling mode the device operates like a conventional temperature controlling device in which the internal heat exchanger serves as evaporator to cool the flow of air sent into the passenger compartment whilst the external heat exchanger releases heat to the outside.

On reversing the direction of flow of the fluid coolant, the internal heat exchanger plays the role of a condenser to raise the temperature of the flow of air to the passenger compartment whilst the external heat exchanger plays the role of an evaporator to remove heat from a heat source, which allows a heating mode to be obtained.

In other words, in the latter case the device operates as a heat pump which takes thermal energy from outside to supply it then to the passenger compartment.

Such a control device is particularly appropriate in an electric vehicle in which the heat produced by the electric drive system is generally not sufficient in winter to cover the heating requirements of the passenger compartment.

Several devices of the type mentioned above have already been suggested in which a single external heat exchanger is provided which has a heat exchange relationship with an external source of heat, such as the electric drive system of the vehicle.

Although such a device operates in a satisfactory manner in cooling mode, its operation in heating mode proves unsatisfactory because the heat produced by the electric drive system is insufficient.

Moreover, in heating mode the external heat exchanger can produce icing problems.

The particular aim of the invention is to overcome the aforementioned disadvantages.

For this purpose it proposes a device of the type defined in the introduction which comprises:

a first external heat exchanger located in the path of a flow of extracted air originating from the passenger compartment, and a second external heat exchanger which, at least in the heating mode, is adapted to exchange heat with a source of heat outside the passenger compartment.

Therefore, when the device operates in heating mode the first external heat exchanger makes it possible to recover the thermal energy in the flow of hot air extracted from the passenger compartment, whilst the second external heat exchanger makes it possible to recover the calorific energy from a source of heat outside the passenger compartment, it being possible for the latter to comprise at least one electric component and/or the electric motor serving to drive the vehicle.

In cooling mode the first external heat exchanger acts as a condenser whilst the second external heat exchanger may act as a condenser or be purely and simply out of use.

In a preferred form of embodiment of the invention, the first external heat exchanger and the second external heat exchanger are mounted in parallel in the cooling fluid circuit.

Alternatively the first external heat exchanger and the second external heat exchanger are mounted in series in the circuit.

In a preferred form of embodiment the first external heat exchanger comprises means for limiting its evaporation pressure to a minimum value when it functions as an evaporator in heating mode.

These pressure limitation means are advantageously constituted by a pressure limitation valve.

This makes it possible to avoid the problems of icing on the first external heat exchanger.

In a preferred form of embodiment of the invention, the first external heat exchanger is an air/liquid heat exchanger located in the path of the flow of air extracted from the passenger compartment.

The said first external heat exchanger may be swept only by the flow of air extracted from the passenger compartment both in the heating and in the cooling mode.

However, it is preferable that the first external heat exchanger should be swept by the flow of extracted air in the heating mode and by a mixture consisting of a flow of extracted air and a flow of external air in the cooling mode.

Thus in the cooling mode a flow of air passes through the first external heat exchanger at a temperature intermediate between that of the flow of recycled air originating from the passenger compartment and the flow of external air, which improves the cooling performance.

In a first general form of embodiment, the second external heat exchanger is an air/liquid heat exchanger located in the path of a flow of external air heated by an external heat source, for example by at least one electric compartment of the vehicle.

Thus an external flow of heated air sweeps directly over the second external heat exchanger.

In a second general form of embodiment, the second external heat exchanger is a liquid/liquid heat exchanger mounted in a cooling circuit acting to cool at least one electric component and/or the electric motor of the vehicle.

Thus the heat exchange performed by the second external heat exchanger is performed by means of a cooling circuit.

A cooling liquid flows through the said cooling circuit which comprises a first branch in which the second external heat exchanger is mounted, a second branch in which a cooling radiator with its associated fan is mounted, and a three-way valve adapted to circulate the cooling liquid at least in the first branch in heating mode, so that the second external heat exchanger is operational, and to circulate the cooling liquid only in the second branch in cooling mode, so that the second external heat exchanger is not operational.

The result of this is that in heating mode the second external heat exchanger recovers thermal energy from outside the passenger compartment by means of the cooling circuit. In the cooling mode the second external heat exchanger is put out of action.

In a first alternative embodiment the said cooling circuit serves to cool at least one electrical component of the vehicle whereas the electric motor is cooled by a separate flow of air.

In this alternative embodiment the flow of air heated by the electric motor is not used.

In another alternative embodiment the cooling circuit again serves to cool at least one electrical component of the vehicle. However, the flow of air for cooling the electric motor is mixed with the flow of air extracted from the passenger compartment to supply the first external heat exchanger, but it does this only in the heating mode.

In a third embodiment the cooling circuit again serves to cool at least one electrical component of the vehicle whereas the flow of air used for cooling the electric motor passes through the radiator mounted in the second branch of the circuit.

Thus in heating mode the thermal energy of the motor is recovered by the second heat exchanger (by means of the cooling circuit) and not by the first external heat exchanger as in the aforementioned fist alternative embodiment.

In the following description, given by way of example only, reference is made to the attached drawings in which FIG. 1 is a diagram of the device in accordance with a first embodiment of the invention, shown in heating mode;

Figure 1:
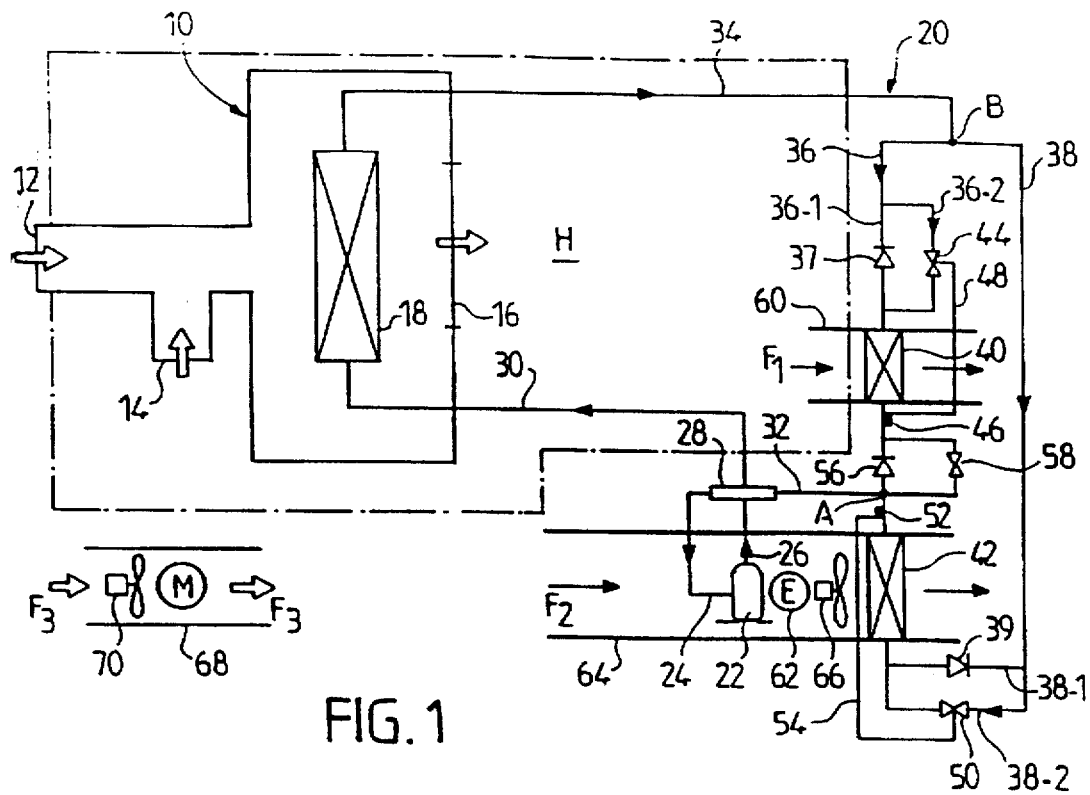

Reference will be made first of all to FIG. 1 which shows a device for controlling the temperature in the passenger compartment H (shown diagrammatically by dashed lines) of a vehicle driven by an electric motor M.

The device comprises an air distribution casing 10 equipped with an inlet 12 for air coming from outside the passenger compartment H and an inlet 14 for recirculated air coming from the interior of the passenger compartment H. The casing 10 in addition comprises an outlet 16 adapted to distribute hot or cooled air inside the passenger compartment H.

Inside the casing 10 an internal heat exchanger 18 is housed which is mounted in a circuit 20 through which passes a fluid coolant which is able to change from the liquid state to the gaseous state when absorbing heat, and from the gaseous state to the liquid state when releasing this heat.

The circuit 20 comprises a compressor 22 the inlet 24 and outlet 26 of which are connected to a four-way valve 28 which is itself connected, on the one hand, to a pipe 30 leading to the heat exchanger 18 and, on the other hand, to a pipe 32 leading to a point A in the circuit.

In the position shown in FIG. 1, the valve 28 connects the outlet 26 of the compressor to the pipe 30 and the inlet 24 of the compressor to the pipe 32.

As a result, the fluid coolant, in the gaseous state, is compressed by the compressor 22 and is sent to the heat exchanger 18, which acts as condenser, to be condensed there and thus release heat into the passenger compartment H.

The condenser 18 is also connected to a pipe 34 which ends at a point B in the circuit.

The points A and B are connected by two channels 36 and 38 arranged in parallel and in which are fitted, respectively, a first external heat exchanger 40 and a second external heat exchanger 42.

Between point B and the heat exchanger 40, the channel 36 divides into two branches; a branch 36-1 comprising a non-return valve 37 allowing circulation of the fluid in the exchanger 40 to the point B, and a branch 36-2 in which is inserted a pressure reducing valve 44. Between the exchanger 40 and the point A the channel 36 contains a temperature sensor 46 connected by a capillary connection 48 to the pressure reducing valve 44, the latter therefore playing the role of a thermostatic pressure reducing valve.

Between point B and the heat exchanger 42, the channel 38 is divided into a first branch 38-1 in which is fitted a non-return valve 39 permitting the circulation of fluid in the direction from the exchanger 42 to the point B, and a branch 38-2 in which is mounted a thermostatic pressure reducing valve 50. The latter is connected to a temperature sensor 52 positioned in the portion of the channel 38 between the heat exchanger 42 and the point A. The temperature sensor 52 is connected to the pressure reducing valve 50 by the intermediary of a capillary connection 54.

Between the sensor 52 and point A a non-return valve 56 is fitted with permits circulation of fluid in the direction from the heat exchanger 42 to point A.

In the pipe 32 connecting the four-way valve 28 to point A a pressure limitation valve 58 is mounted which is adapted to prevent the occurrence of icing on the heat exchanger 40.

The heat exchanger 40 is an exchanger of the air/liquid type and it is swept by a flow of air F1 extracted from the passenger compartment H and flowing in the duct 60.

The heat exchanger 42 is swept by a flow of air F2 taken from outside the passenger compartment and heated by an external heat source which, in this example, comprises the compressor 22 and at least one electrical component 62 shown diagrammatically by the reference E. This electrical component may be, for example, the electric batteries of the vehicle, its electronic control circuit, etc.

The flow of air F2 flows inside a duct 64 and preferably is moved by a motorized fan 66.

For its part, the electric motor M is cooled by a flow of air F3 flowing in a duct 68 as a result of the action of a fan 70. However, the thermal energy thus produced by the motor is not recovered.

In the case shown in FIG. 1, the device operates in heating mode. The fluid coolant in the gaseous state is compressed by the compressor 22 and sent to the internal heat exchanger 18 (which acts as a condenser) where it condenses producing heat which serves to heat the flow of air sent into the passenger compartment. The fluid in the liquid state then reaches point B in the circuit and is distributed into the two channels 36 and 38. In channel 36 it first passes through the pressure reducing valve 44 in the branch 36-2 before passing through the heat exchanger 40 and reaching point A.

In channel 38, the fluid coolant in the liquid state passes through the pressure reducing valve 50 in the branch 38-2 before passing through the heat exchanger 42 and reaching point A. The fluid vaporizes in the two exchangers 40 and 42, which act as evaporators. The gaseous fluid emerging from the exchanger 40 then passes through the pressure limitation valve 56 before returning to the compressor 22. The valve 58 makes it possible to limit the evaporation pressure of the exchanger 40 to a predetermined minimum valve so that the temperature of the air leaving the exchanger 40 always remains positive, so as to avoid icing problems.

This procedure makes it possible to avoid the recovery of thermal energy contained in the air extracted from the passenger compartment being performed by the heat exchanger 42 after mixing with the cold, dry outside air. This also makes it possible to retard the occurrence of icing of the heat exchanger 42.

Figure 2:
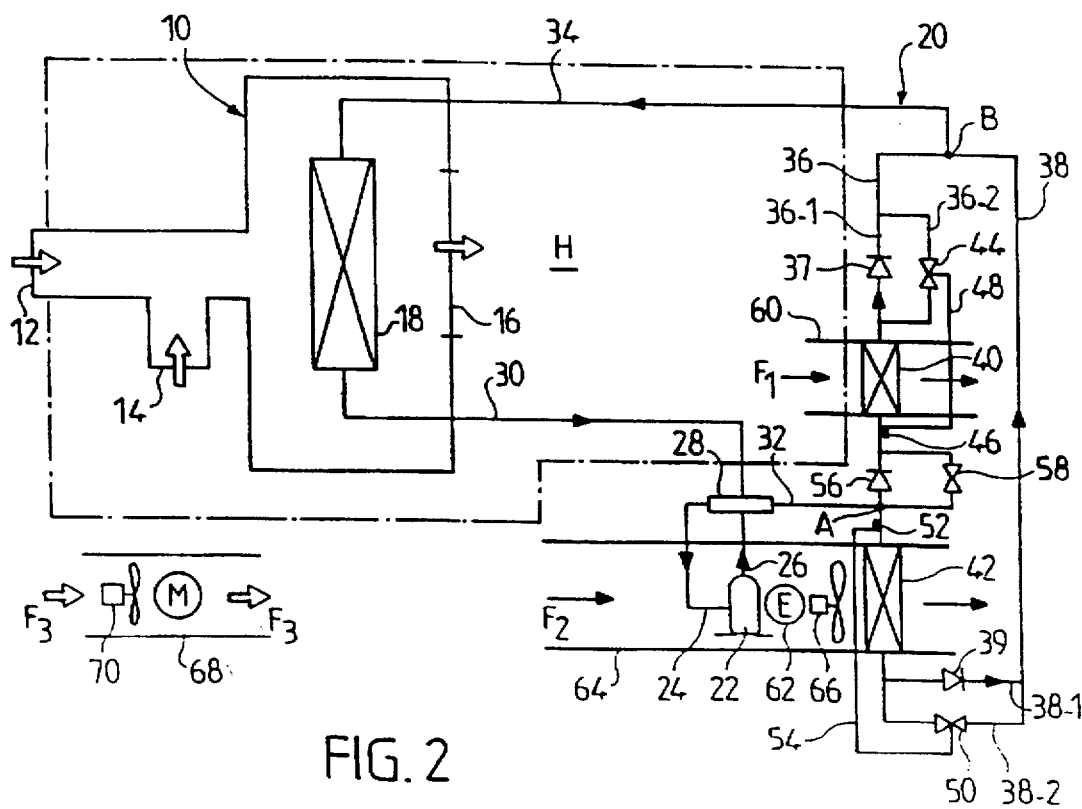
FIG. 2 is a diagram of the same device shown in cooling mode.

Reference will now be made to FIG. 2 which shows the same device in cooling mode. The position of the valve 28 is reversed so that the outlet 26 of the compressor is in communication with the pipe 32, whereas its inlet 24 is in communication with the pipe 30.

The fluid coolant in the gaseous state is compressed by the compressor 22 and is sent to point A in the circuit. From there the fluid is distributed into the branches 36 and 38. In the branch 36 it passes first of all through the valve 56 and then the heat exchanger 40 (acting as a condenser) where the fluid condenses to the liquid state. Then it passes through the branch 36-1 containing the non-return valve 37.

In the branch 38, the fluid coolant in the gaseous state passes first of all through the heat exchanger 42 (acting as a condenser) where it condenses to the liquid state before passing through the valve 39.

The fluid then arrives at the point B and from there reaches the internal heat exchanger 18 which then plays the role of an evaporator.

Thus, in this mode of operation, the device removes thermal energy from the flow of air sent into the passenger compartment in order to cool it and releases the said energy to the external heat exchangers 40 and 42.

Figure 3:
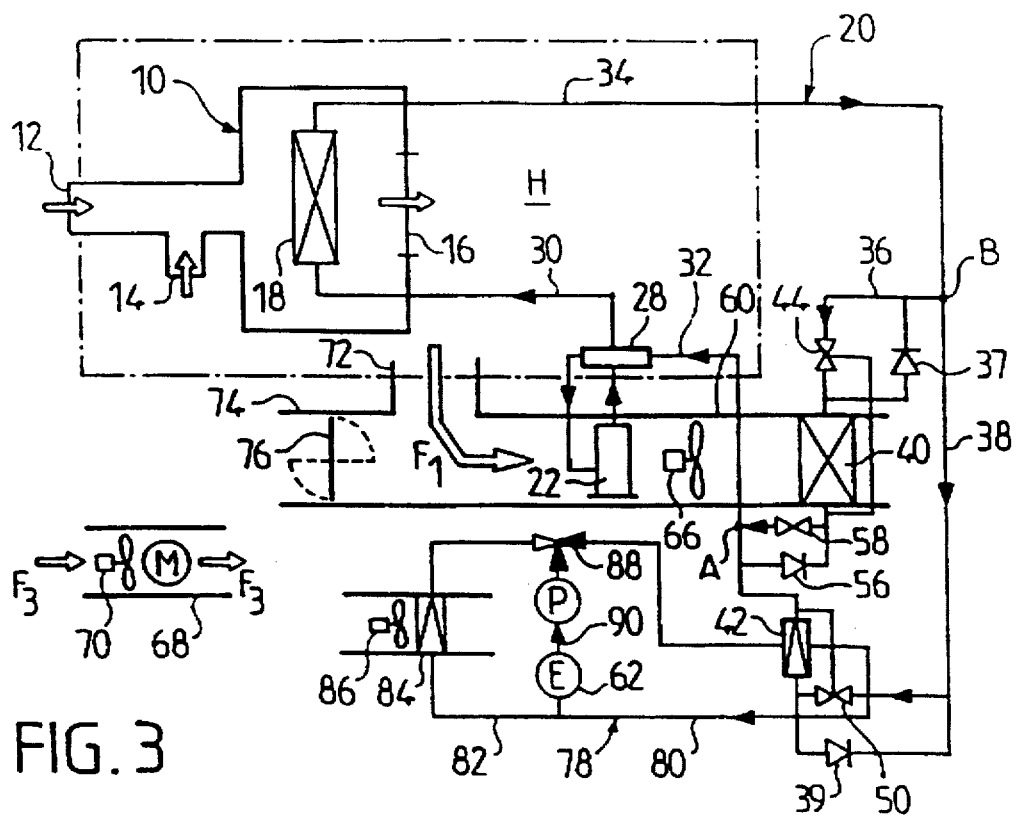
FIG. 3 is a diagram of the device in accordance with a second embodiment of the invention, shown in heating mode.

In the embodiment shown in FIG. 3, which is now referred to, the elements which are the same as those in FIGS. 1 and 2 are given the same reference markings. The compressor 22 is situated in the duct 60 conducting the flow of air F1 extracted from the passenger compartment. The duct 60 contains the fan 66 which was situated inside the duct 64 in the case of FIGS. 1 and 2. It should however be noted that the fan 66 is switched off in heating mode (FIG. 3) and only operates in cooling mode (FIG. 4).

The duct 60 is equipped with an air inlet 72 for the air extracted from the passenger compartment and an air inlet 74 for outside air, the said air inlet 74 being controlled by a supply valve 76. In the heating mode (FIG. 3) the valve 76 is closed so that the heat exchanger 40 is supplied only with air extracted from the passenger compartment. In the cooling mode (FIG. 4) the valve 76 is in the open position so that the heat exchanger 40 is supplied with a mixture of internal air extracted from the passenger compartment (recirculated air) and outside air taken from outside the passenger compartment.

Figure 4:
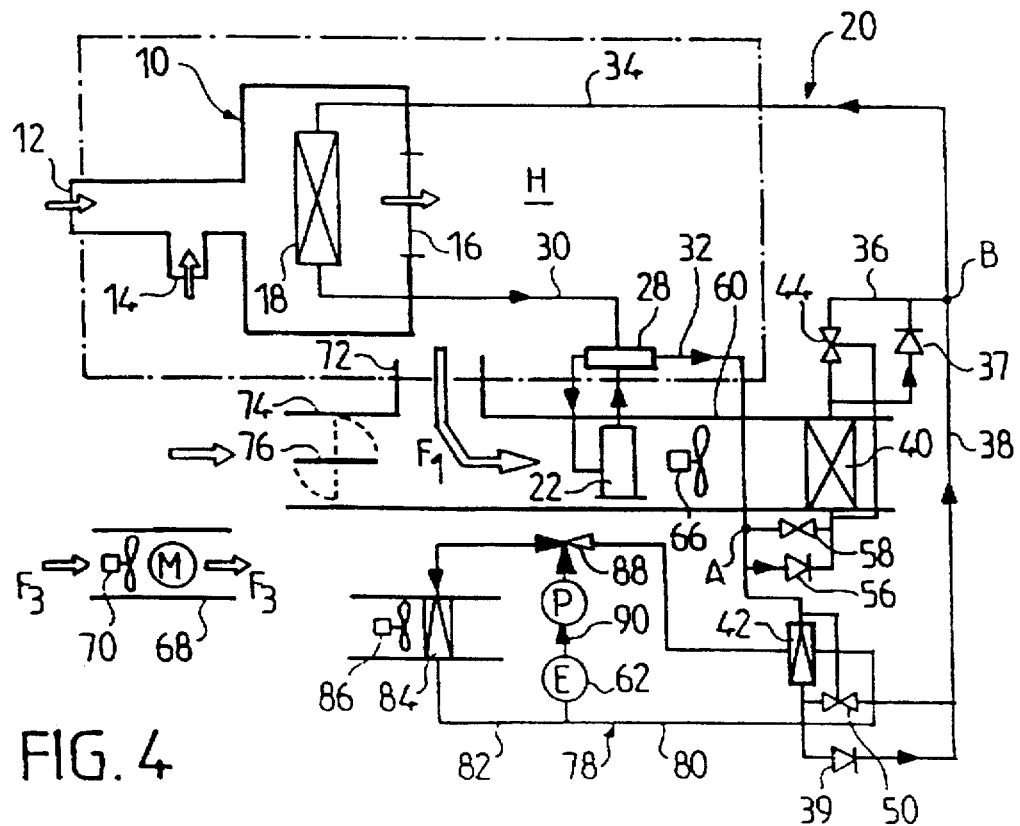
FIG. 4 is a diagram showing the device of FIG. 3 in cooling mode.

In the embodiment shown in FIGS. 3 and 4, the second external heat exchanger 42 is an exchanger of the liquid/liquid type. The exchanger 42 is fitted in a cooling circuit 78 serving to cool at least one electrical component 62 (shown schematically by the letter E). A cooling liquid (usually water with added anti-freeze) flows through the cooling circuit 78. It comprises a first branch 80, in which the heat exchanger 42 is fitted, a second branch 82, in which a cooling radiator 84 with its associated fan 86 is fitted, and a three-way valve 88 adapted to cause the cooling liquid to circulate in the first branch 80 in the heating mode (FIG. 3) and in the second branch 82 in the cooling mode (FIG. 4). The circuit 78 also comprises a common branch 90 in which the electrical component 62 and a water pump P are fitted.

In the heating mode, the internal heat exchanger 18 acts as a condenser as in the embodiment in FIGS. 1 and 2.

For its part the external heat exchanger 40 then acts as an evaporator and recovers part of the thermal energy of the air extracted from the passenger compartment and of the heat from the compressor 22.

However, in the said heating mode the heat exchanger 42 acts as an evaporator recovering, by means of the cooling circuit 78, heat energy from outside the passenger compartment, this energy being supplied in particular by the electrical component or components 62.

It should be noted that, as in the embodiment in FIGS. 1 and 2, the heat energy produced by the motor M of the vehicle is not recovered.

In the cooling mode shown in FIG. 4, the direction of flow of the fluid coolant is reversed and the internal heat exchanger 18 acts as an evaporator, whereas the heat exchanger 40 acts as a condenser. Through the latter passes a mixture of recirculated air originating from the passenger compartment and air from outside the passenger compartment.

On the other hand, the heat exchanger 42 is rendered inoperative because the cooling liquid in the circuit 78 circulates only in the second branch 82 and in the common branch 90. The electrical component or components of the vehicle is, or are, cooled by the radiator 84 and its associated fan 86.

Figure 5:
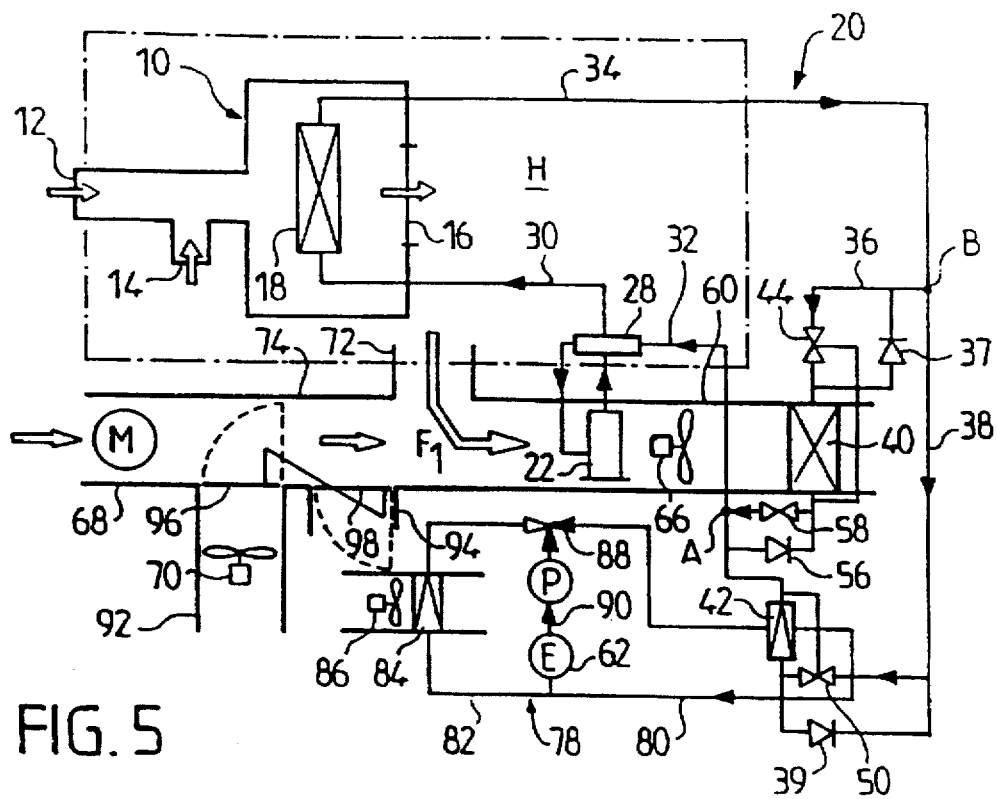
FIG. 5 is a diagram of the device in accordance with a third embodiment of the invention, shown in heating mode.
Figure 6:
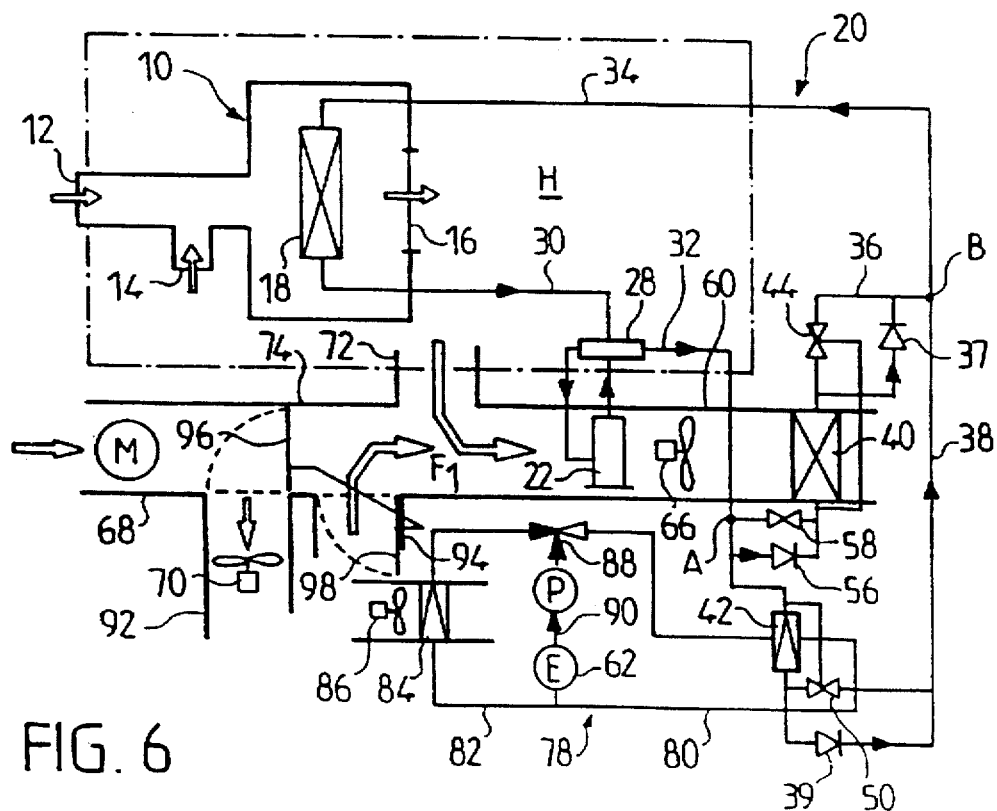
FIG. 6 is a diagram showing the device of FIG. 5 in cooling mode.

Reference will now be made to FIGS. 5 and 6 which show a variant of the device in FIGS. 3 and 4. The elements similar to those in the previous Figures are designated by the same reference numbers and letters.

In this alternative the duct 68 conducting the cooling air from the electric motor m is connected to the inlet 74 of the duct 60 ending at the heat exchanger 40.

The fan 70 associated with the electric motor M is housed in a lateral duct 92 which ends at the inlet 74 of the duct 60. The duct 60 is also provided with an inlet 94 for outside air.

The inlet to the duct 60 is controlled by two valves 96 and 98.

In the heating position (FIG. 5) the valves 96 and 98 allow air heated by the electric motor m to mix with the flow of recycled air originating from the passenger compartment to supply the heat exchanger 40.

In the cooling mode (FIG. 6) the valves 96 and 98 simultaneously make it possible to direct the air used for cooling the electric motor directly to the outside, thanks to a motorized fan 70 which is switched on, and also to supply the external heat exchanger 40 with external air. The latter is then supplied by a mixture of recirculated air originating from the passenger compartment and outside air coming from outside the passenger compartment.

Figure 7:
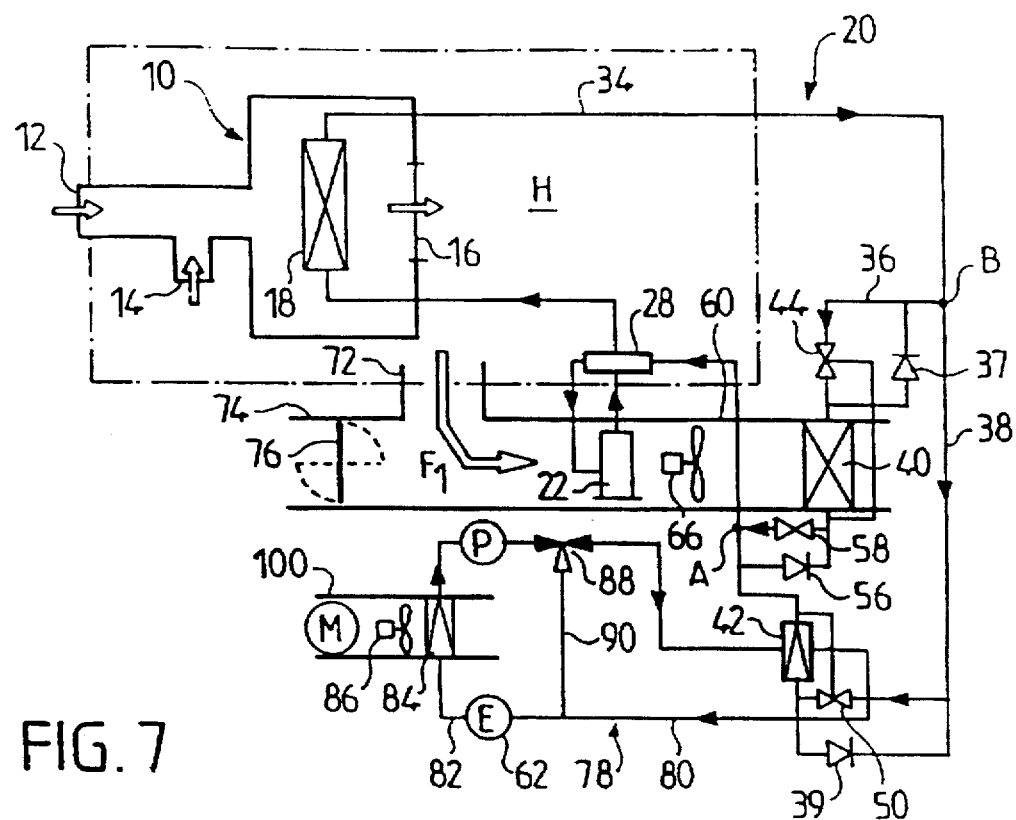
FIG. 7 is a diagram of the device in accordance with a fourth embodiment of the invention, shown in heating mode.
Figure 8:
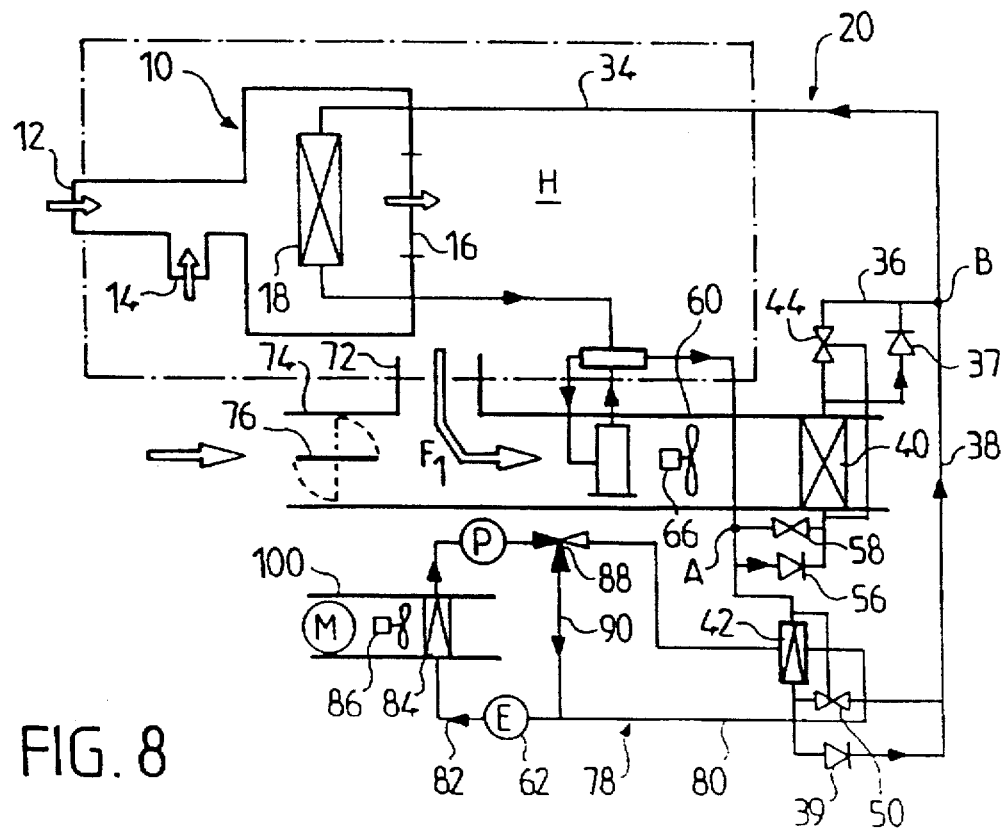
FIG. 8 is a diagram showing the device of FIG. 7 in cooling mode.

In the embodiment shown in FIGS. 5 and 6, the method of operation of the second external heat exchanger 42 is identical to that in the previous case. It is only in operation in the heating mode as shown in FIG. 5. Reference will now be made to FIGS. 7 and 8.

The latter are variants of FIGS. 3 and 4 and the common elements are designated by the same reference numbers and letters.

The supply to the heat exchanger 40 is identical to that in the case of FIGS. 3 and 4. The heat exchanger 40 is supplied only by the recirculated air extracted from the passenger compartment when in the heating mode (FIG. 7) and by a mixture of recirculated air extracted from the passenger compartment and an external mixture coming from outside the passenger compartment in the cooling mode (FIG. 8).

The essential difference here relates to the heat exchanger 42. The latter is still integrated in a cooling circuit 78 comprising two branches 80 and 82, a common branch 90 and a three-way valve 88.

In this alternative embodiment the water pump P and the electrical components 62 are mounted in the second branch 82. The radiators 84 and the fan 86 are housed in a duct 100 through which warm air having served to cool the electric motor M also passes. In the heating mode (FIG. 7) the valve 88 is in a position such that the cooling liquid flows through both the branch 80 and the branch 82, without passing through the branch 90. The radiator 84 then allows part of the heat energy obtained by cooling the electric motor to be contributed to the cooling circuit 78.

This thermal energy is recovered by the heat exchanger 42 which then acts as an evaporator.

In the cooling mode (FIG. 8) the valve 88 is in a position such that the cooling liquid flows through the first branch and the branch 90 without passing through the heat exchanger 42.

The cooling circuit then provides cooling to the electric motor M.

In the heating mode the cooling circuit also recovers part of the heat energy emitted by the electrical component or components of the vehicle.

Of course, the invention is not limited to the embodiments described above by way of example and covers other alternative embodiments.

We claim:

1. A device for controlling the temperature in the passenger compartment of an electric motor vehicle, comprising a circuit through which flows a fluid coolant, which is circulated by a compressor, between an internal heat exchanger located in the path of a flow of air towards the vehicle and an external heat exchanger, as well as means for reversing the direction of flow of the fluid coolant, such that the internal heat exchanger and the external heat exchanger function respectively as evaporator and condenser in a cooling mode and respectively as condenser and evaporator in a heating mode, characterized in that it comprises:

a first external heat exchanger located in the path of a flow of extracted air originating from the passenger compartment, and a second external heat exchanger which, at least in the heating mode, is adapted to exchange heat with a source of heat outside the passenger compartment.

2. A device according to claim 1, characterized in that the first external heat exchanger and the second external heat exchanger are mounted in parallel in the circuit of the fluid coolant.

3. A device according to claim 2, characterized in that the first external heat exchanger comprises means for limiting its evaporation pressure to a minimum value when it functions as an evaporator in heating mode.

4. A device according to claim 1, characterized in that the first external heat exchanger and the second external heat exchanger are mounted in series in the circuit of the fluid coolant.

5. A device according to claim 4, characterized in that the first external heat exchanger comprises means for limiting its evaporation pressure to a minimum value when it functions as an evaporator in heating mode.

6. A device according to claim 1, characterized in that the first external heat exchanger comprises means for limiting its evaporation pressure to a minimum value when it functions as an evaporator in heating mode.

7. A device according to claim 6, characterized in that the pressure limiting means comprise a pressure limitation valve.

8. A device according to claim 7, characterized in that the first external heat exchanger is an air/liquid heat exchanger located in the path of the flow of extracted air originating from the passenger compartment.

9. A device according to claim 1, characterized in that the first external heat exchanger is an air/liquid heat exchanger located in the path of the flow of extracted air originating from the passenger compartment.

10. A device according to claim 9, characterized in that the first external heat exchanger is swept only by the flow of extracted air, both in the heating and in the cooling mode.

11. A device according to claim 9, characterized in that the first external heat exchanger is swept by the flow of extracted air in the heating mode and by a mixture consisting of a flow of extracted air and a flow of external air in the cooling mode.

12. A device according to claim 11, characterized in that the second external heat exchanger is an air/liquid heat exchanger located in the path of a flow of external air heated by an external heat source.

13. A device according to claim 11, characterized in that the second external heat exchanger is a liquid/liquid heat exchanger mounted in a cooling circuit acting to cool at least one electrical component of the vehicle.

14. A device according to claim 1, characterized in that the second external heat exchanger is an air/liquid heat exchanger located in the path of a flow of external air heated by an external heat source.

15. A device according to claim 1, characterized in that the second external heat exchanger is a liquid/liquid heat exchanger mounted in a cooling circuit acting to cool at least one electrical component of the vehicle.

16. A device according to claim 15, characterized in that a cooling liquid flows through the cooling circuit, flowing through a first branch in which the second external heat exchanger is mounted, a second branch in which a cooling radiator with its associated fan is mounted and a three-way valve adapted to circulate the cooling liquid at least in the first branch in heating mode, so that the second external heat exchanger is operational, and only in the second branch in cooling mode, so that the second external heat exchanger is not operational.

17. A device according to claim 16, characterized in that the cooling circuit serves to cool at least one electrical component of the vehicle, the electric motor being cooled by a separate flow of air.

18. A device according to claim 16, characterized in that the cooling circuit serves to cool at least electrical component of the vehicle, whilst the flow of air for cooling the electric motor is mixed with the flow of extracted air from the passenger compartment to supply the first external heat exchanger only in the heating mode.

19. A device according to claim 16, characterized in that the cooling circuit serves to cool at least one electrical component of the vehicle and in that the flow of air used for cooling the electric motor passes through the radiator mounted in the second branch of the circuit.

* * * * *